(12) United States Patent
Thomson et al.

(10) Patent No.: US 8,144,600 B2
(45) Date of Patent: Mar. 27, 2012

(54) OPTIMIZATION FOR WIRELESS ACCESS POINT MANAGEMENT

(75) Inventors: Allan Thomson, Pleasanton, CA (US); Christopher Johnson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 11/972,277

(22) Filed: Jan. 10, 2008

(65) Prior Publication Data

US 2009/0182862 A1     Jul. 16, 2009

(51) Int. Cl.
*G01R 31/08*     (2006.01)

(52) U.S. Cl. ........................ 370/241; 709/224

(58) Field of Classification Search ................. 370/241; 455/425, 450
See application file for complete search history.

(56) References Cited

U.S. PATENT DOCUMENTS

| | | | |
|---|---|---|---|
| 6,714,605 B2 | 3/2004 | Sugar et al. | |
| 6,850,735 B2 | 2/2005 | Sugar et al. | |
| 6,944,449 B1 * | 9/2005 | Gandhi et al. | 455/425 |
| 7,006,838 B2 | 2/2006 | Diener et al. | |
| 7,016,684 B2 * | 3/2006 | Cave et al. | 455/450 |
| 7,035,593 B2 | 4/2006 | Miller et al. | |
| 7,110,756 B2 | 9/2006 | Diener | |
| 7,116,943 B2 | 10/2006 | Sugar et al. | |
| 7,142,108 B2 | 11/2006 | Diener et al. | |
| 7,184,777 B2 | 2/2007 | Diener et al. | |
| 7,224,752 B2 | 5/2007 | Sugar et al. | |
| 2003/0198200 A1 | 10/2003 | Diener et al. | |
| 2004/0028123 A1 | 2/2004 | Sugar et al. | |
| 2004/0047324 A1 | 3/2004 | Diener | |
| 2005/0002473 A1 | 1/2005 | Kloper et al. | |
| 2005/0227625 A1 | 10/2005 | Diener | |
| 2005/0285793 A1 | 12/2005 | Sugar et al. | |
| 2007/0249366 A1 | 10/2007 | Thomson et al. | |
| 2009/0003219 A1 * | 1/2009 | Beacham et al. | 370/241 |

OTHER PUBLICATIONS

Cognio—Spectrum Expert 3.1 "Interference can destroy your WiFi network. Put the power of Spectrum Expert to work to fix it." http://www.cognic.com, 2007 Cognio, Inc., Germantown, MD.

* cited by examiner

*Primary Examiner* — Ricky Ngo
*Assistant Examiner* — David Oveissi
(74) *Attorney, Agent, or Firm* — Brinks Hofer Gilson & Lione

(57) ABSTRACT

In one embodiment, wireless access point management is optimized. The data bandwidth and/or processing requirements for data indicating operation of the access point is baselined. For example, air quality or interference measurements are made at the access point on a regular basis. The interference measurements over one or more periods, such as one period of 24 hours, provide a baseline. Rather than transmitting and processing the subsequent measurements that are normal or within the baseline, a lack of information or data requiring less bandwidth than the measurements communicates to a controller or server that the measurements are normal or within the baseline.

19 Claims, 2 Drawing Sheets

OPTIMIZATION FOR WIRELESS ACCESS POINT MANAGEMENT

BACKGROUND

The present disclosure relates generally to wireless network management.

A wireless network may include access points. A wireless access point receives and routes data traffic for a computer network. A plurality of computers may establish communications with a local access point, such as using WiFi communication.

A network of access points may be provided, such as in a building or outdoor environment. To manage operation of the access points and/or network, a controller monitors access point operation. Autonomous access points operating without a separate or network controller may be provided. A server may be provided for monitoring. In addition to routing data traffic, management data is communicated from the access points to the controller and/or server. The network or access points may be configured based on the management data.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
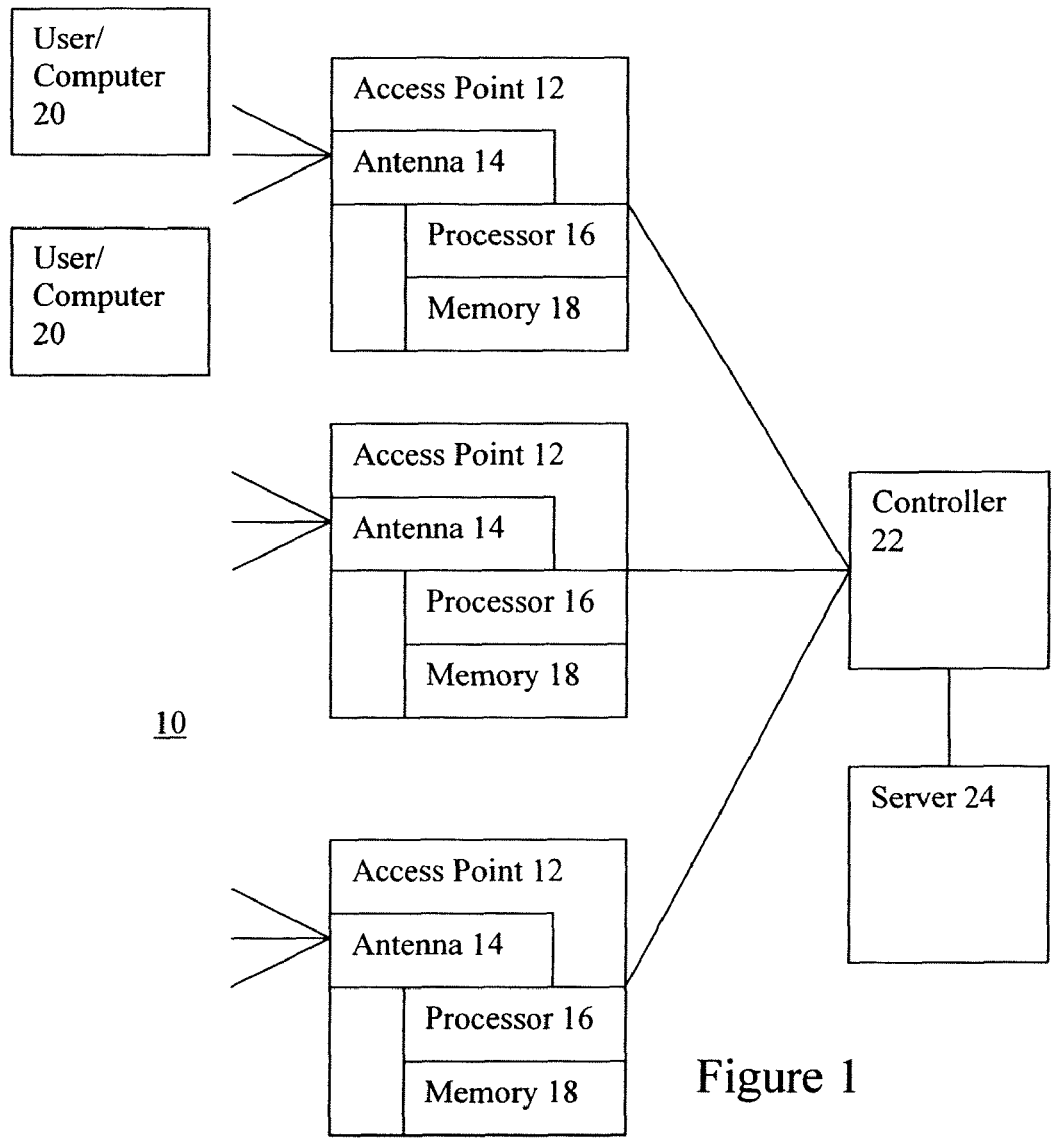
FIG. 1 illustrates one embodiment of a system for optimization of wireless access point management.

By way of introduction, the example embodiments described below include a system, computer readable media, and a method for optimization of wireless network management. The data bandwidth and/or processing requirements for data indicating operation of the access point is baselined. For example, air quality or interference measurements are made at the access point on a regular basis. The interference measurements over one or more periods, such as a period of 24 hours, provide a baseline. Subsequent measurements are compared to the baseline. For measurements that are normal or within the baseline, a lack of information or data requiring less bandwidth than the measurements is communicated to a controller or server.

According to a first aspect, a method is provided. First operation information for a wireless access point is generated over a first time. The first operation information is baselined, providing a baseline of operation. Second operation information for the wireless access point is generated. The second operation information is compared to the baseline.

In a second aspect, an apparatus is provided. An access point is operable to route wireless data. A processor is operable to output an indication of an operation of the access point. The indication is a function of a baseline. The baseline has different values as a function of time. The operation is at a first time associated with one of the values of the baseline.

In a third aspect, a system is provided. A controller is operable to communicate with a plurality of access points. A server is operable to communicate with the controller. The controller, server, or combination thereof is operable to determine a reference performance level of each of the access points and communicate the reference performance levels to the respective access points. Each of the access points are operable to compare a current performance level to the respective reference performance level and communicate less performance data to the controller, server, or combinations thereof when the current performance level is within a threshold range of the reference performance level for the respective access point and more of the performance data when the current performance level is not within the threshold range. The reference performance level is maintained for at least a first period regardless of the current performance levels within the first period being outside the threshold range.

The present invention is defined by the following claims, and nothing in this section should be taken as a limitation on those claims. Further aspects and advantages of the invention are discussed below in conjunction with the example embodiments.

Example Embodiments

Air quality or other operation metrics (e.g., usage data, rogue user information, or customer specific data) may be monitored at one or more access points. For example, each access point measures spectrum interference for one or more channels. A metric may be derived from the measurements, such as calculating an air quality metric as a function of the percentage of time a channel exceeds a clear channel assessment value, the percentage of time a measured pulse period is below 500 microseconds, a duty cycle, power of individual interferers, and/or other factors. The derived metric and/or measurements are baselined to reduce management data traffic load and/or processing. The management data is baselined over time to reduce the amount of new data sent or processed by the peer system (e.g., controller and/or server). Each baseline is time-based and specific to locations within the network, so that over the course of the baseline period (e.g., 24 hours), individual baselines per floor, per building may be pushed to the network. The server or management station configures the appropriate network controllers and/or applications with the baseline information.

Management data load may be reduced on the access point-to-controller and the controller-to-server links, the processing requirements of the controller for new management data may be reduced, and the storage requirements for the management data may be reduced. Without baselining, a larger amount of duplicate management data (e.g., air quality metric) may be processed that remains the same or within a varying range throughout a day or other period, creating load on the link and the controller central processing unit.

FIG. 1 shows one embodiment of a wireless network system 10. The system 10 includes access points 12 for providing a wireless network, but a single access point 12 may be provided. For example, the system 10 is part of a wireless local area network operable pursuant to IEEE 802.11 (e.g., 2.4 GHz 802.11b and 802.11g). In one embodiment, the system 10 is a WiFi system. The system 10 includes a unified wireless network or central management system. Alternatively, the system is an autonomous system.

The system 10 is located in a building, such as a wireless network for a company or for public use, but may be an outdoor network, such as a mesh network. The system 10 provides wireless domain services, such as Internet access, local area network access, wide area network access, voice-over-IP phone access, gaming, network connectivity, or other wireless data routing for one or more users 20 through hot spots. The system 10 connects to the Internet, an intranet, a local area network ("LAN"), a wide area network ("WAN"), a virtual private network ("VPN"), and/or any known or future network. Alternatively or additionally, the system 10 provides the entirety of the local area network.

The system 10 includes, but is not limited to, one or more access points 12, a controller 22, and a server 24. Additional, different, or fewer components may be provided. For example, a proxy server, a billing server, a router, a switch or intelligent switch, a computer or workstation, administrative components, such as an administrative workstation, a gateway device, a backbone, ports, network, and/or network interfaces may be provided. The components of the system 10 connect and communicate with wired and/or wireless connections. For example, the components of the system 10 communicate via any known or future network. In one embodiment, wired connections interconnect the access points 12 with one or more controllers 22 and/or one or more servers 24. One simple network topology is shown in FIG. 1, but other topologies may be used with the same or different structure or links.

The system 10 provides wireless services for one or more users 20. For example, the system 10 is for wireless communications from the users 20 with each other or other components of the same or different networks. The users 20 are computers, consumer electronics (e.g., televisions, DVD players, and digital cameras), servers, routers, phones, and/or other devices. The users 20 are members of one or more groups or companies. Alternatively, one or more users may be members of the public. The system 10 may provide secure or unsecured access to the network.

The access points 12 connect the users 20 or another network wirelessly to a wired or other network. In one embodiment, the connection is performed at the data-link layer. Each access point 12 is an apparatus for routing wireless data between the users 20 and the network of the system 10 or to another network. The access points 12 provide any number of channels, such as 11, 13, or 14 channels within the designated spectrum, such as around 2.4 GHz.

Each access point 12 has the same structure, but one or more access points may have different structures. In one embodiment, the access points 12 include an antenna 14, a processor 16, and a memory 18. Additional, different, or fewer components may be provided, such as a plurality of antennas and/or additional processors. For example, the access points 12 include spectrum analyzers, such as a circuit or other hardware and software for measuring spectrum. In one embodiment, the access points include the spectrum analysis engine of U.S. Pat. Nos. 6,714,605 or 7,224,752 or Publication Nos. 2004/0028123 or 2005/0002473, the classification of U.S. Pat. Nos. 6,850,735, 7,035,593, or 7,116,943, the location system and methods of U.S. Pat. Nos. 7,110,756 or 7,006,838 or Publication No. 2005/0285793, monitoring of U.S. Pat. No. 7,142,108, the management of U.S. Pat. No. 7,184,777 or Publication Nos. 2003/0198200, 2004/0047324 or 2005/0227625, the disclosures of which are incorporated by reference. The hardware, software, or other logic of these may be used. Any one or more embodiments of these disclosures may be used alone or in combination. Other spectrum analyzers, management, monitoring, classification, or spectrum engines may be provided.

The processor 16 is operable to communicate with the memory 18. The processor 16 may be in communication with more or fewer components. The processor 16 is a general processor, central processing unit, server, application-specific integrated circuit ("ASIC"), digital signal processor, field programmable gate array ("FPGA"), digital circuit, analog circuit, or combinations thereof. The processor 16 is one or more processors or devices operable to route data traffic to or from the users 20.

The memory 18 is any known or future storage device. The memory 18 is a non-volatile and/or volatile memory, such as a Random Access Memory "RAM" (electronic), a Read-Only Memory "ROM" (electronic), or an Erasable Programmable Read-Only Memory (EPROM or Flash memory). Optical, magnetic (hard drive), or other memory devices may be used.

The antenna 14 is a directional, omni-directional, point-to-point, point-to-multipoint, or other antenna. For example, the antenna 14 is one or more of a vertical omni, ceiling dome, rubber duck, small desktop, mobile vertical, backfire, yagi, panel, or dish antenna. The antenna 14 is connected with the processor 16 for transmitting and receiving data traffic.

The processor 16 is operable to measure operation or receive measurements of operation of the spectrum and/or the access point 12. The processor 16 may provide any statistic, data, measurement, or other operation information for management of the access point 12. For example, spectrum analysis information, interference data, channel usage information, usage statistics, user information, client statistics, rogue or unauthorized user information, combinations thereof, and/or other information are determined by the processor 16. The processor 16 causes the management data to be transmitted to the controller 22 and/or server 24 for management of the system 10, including the access points 12.

To minimize traffic load due to the operation information, the processor 16 may implement baselining. The processor 16, the controller 22, the server 24, or combinations thereof establish a baseline of operation over a period.

The operation information is a single metric, such as an air quality metric, or a plurality of values. The operation information is determined periodically or in response to a triggering event. For example, the operation information is acquired once every second to multiple minutes. Different operation information may be acquired at different intervals.

Since the operation may vary regularly over a period, the baseline is established over a desired period. Any period may be used, such as over 24 hours, over a week, over a month, or other possible period. The period may not correspond to regularity of spectrum or operational changes, such as being every 5 hours where the usage generally repeats over a 24-hour period.

After determining the baseline, newly received or determined operation information is compared to the baseline. A current performance level is compared to the respective reference performance level for identifying normal or non-normal operation. For example, the interference and/or usage of a particular channel may increase for a specific time of day as compared to normal or the baseline. As another example, the interference, usage, or air quality may be less than the baseline.

The baseline provides a range of acceptable values. For example, any interference from none up to a particular level is normal or within the baseline. The range may not include a zero level, such as providing a threshold deviance from a value. The threshold difference for exceeding the average is the same or different than the threshold difference for being below the average. The threshold difference may be zero, such as any comparison showing the current value to exceed the baseline as abnormal.

The processor 16 outputs an indication of operation of the access point 12. The indication is based on or a function of the baseline. The same type of interference measurement or other value for one or more channels is compared to a baseline for that type of value. The baseline has different values as a function of time. For comparison, the operation at a current time is associated with one of the values of the baseline. The association identifies the baseline value corresponding to the similar time, such as the same time of day. The current performance level is compared to the reference performance level with the respective time in a previous cycle or cycles.

An indication of current performance is based on the comparison. The indication is the operation information where the measurement exceeds the baseline, such as exceeding a threshold difference from the baseline. Where the comparison indicates the operation, such as air quality metric or value, as abnormal, the operation information is output as the indication. Additionally or alternatively, other indications are output, such as an indicator of the difference from normal or a number of steps of a known size from normal or the baseline.

Less performance data is output to the controller, server, or combinations thereof when the current performance level is within the reference performance level for the respective access point or channel. The indication is a result of the comparison or no data. For example, the measurement of operation has a first number of bits. If the current measurement of operation is within the baseline, an indication of a single or less number of bits than the measurement is output. The indication encodes the operation as being within the baseline. Alternatively, a lack of output of data is an indication of normal operation or operation within the baseline.

Where the baseline is known, the actual measurements and corresponding traffic load do not need to be used. Where the measurement is not within the baseline, the measurement may not be known without transmission. More of the performance data is transmitted when the current performance level is not within the threshold range. The indication is no data, data indication baseline operation, the measurements, a derived metric, or combinations thereof.

The processor 12 maintains the baseline despite variation of the operation outside of the baseline. The reference performance level is the same for at least a period regardless of the current performance levels within the period being outside the threshold range. For example, the baseline is used for weeks or other multiple of the reference period. The baseline may be updated periodically. In alternative embodiments, the baseline is updated in response to a trigger, such as measurements outside of the baseline for a length of time or number of times or such as a change in topology.

The indication is backhauled (e.g., transmitted) to the controller 22 and/or server 24. The controller 22 is operable to communicate with one or more access points 12. For example, the controller 22 is in a closet or datacenter and connects with wires to the access points 12. The controller 22 manages operation of the access points 22 and/or provides further routing of the traffic.

The controller 22 is a server, processor, memory, database, computer, network, application specific integrated circuit, field programmable gate array, digital circuit, analog circuit or combinations thereof. The controller 22 is implemented as hardware, software, or combinations thereof. For example, the controller 22 is an application program running on a multi-use device. Alternatively, the controller 22 is any other hardware that executes and runs a controller application. A hardware implementation includes, but is not limited to, a processor and a memory.

The server 24 is a server that provides one or more management services (e.g., providing location services), but other wireless network management system servers may be used. The server 24 may be a different type of server, such as a provider server, an application server, communications server, advertisement server, database server, proxy server, file server, web server, client server, peer-to-peer server, and/or any known or future server.

The server 24 manages the network or system 10 topology, such as calculating the location of devices on the network. The server 24 receives error information, collects statistics data, and/or manages network configuration. Any communications or data format may be used. The server 24 may manage a plurality of controllers 22 and corresponding access points 12. The server 24 is operable to communicate with the controllers 22 and/or the access points 12.

The server 24 is a software and/or hardware implementation. For example, the server 24 is an application program. Alternatively, the server 24 is a server computer or any other hardware that executes and runs server applications. For example, the server 24 includes a user interface (display and input) for interacting with a network administrator. A hardware implementation of the server 24 may include, but is not limited to, a processor and a memory. Additional, different, or fewer components may be provided.

The controller 22, server 24, or a combination thereof manages the access points 12. The management includes the baseline operation. For example, the baseline is determined by the controller 22 or server 24. Measurements or other operation information are received. The controller 22 or server 24 uses the received operation data without change, such as using statistics, measurements, derivations of measurements, or metrics received from the access points 12. Alternatively, the controller 22 or server 24 derives the baseline information. For example, the headers or other information of traffic routed by the system 10 are examined to determine user statistics, channel usage, rogue users, or other management information. As another example, measurements, such as air quality, are used to derive a metric.

The controller 22 or server 24 uses the received information to form the baseline. A reference performance level is determined for each of the access points. Baselines may be for each channel of each access point. A different baseline may be provided for each directional antenna 14. Different baselines may be provided for different types of information. The baseline is determined over the desired period.

The controller 22 or server 24 communicates the reference performance levels to the respective access points 12. For example, baselines for each channel of an access point 12 are pushed or transmitted to the access point 12. The baseline data includes the metric, measure, or other operation information as a function of time. A sparse set may be provided for interpolation or extrapolation, such as providing the baseline in hour increments for interpolation into minute increments.

The baseline corresponds with a period. Data for determining the baseline for the entire period is provided. Alternatively, portions of the baseline are provided at different times. For example, each day represented by a weeklong baseline is provided just before the start of the corresponding day. Providing portions may conserve memory space at the access points 12.

The controller 22, the server 24, or a combination thereof is operable to record operation of the access points 12 for management, analysis, and/or planning. For example, a database of ongoing operation is maintained. Where operation is within the baseline, a time stamp associated with the reference performance level is updated in response to receiving the indication (e.g., result of the comparison). Where the operation is not within the threshold range of baseline operation, the current performance data is stored with a time stamp. Accordingly, the stored data indicates the times of normal operation and the operation values or information associated with abnormal operation. In other embodiments, a table is created indicating the measurements or baseline operation for each possible time.

Figure 2:
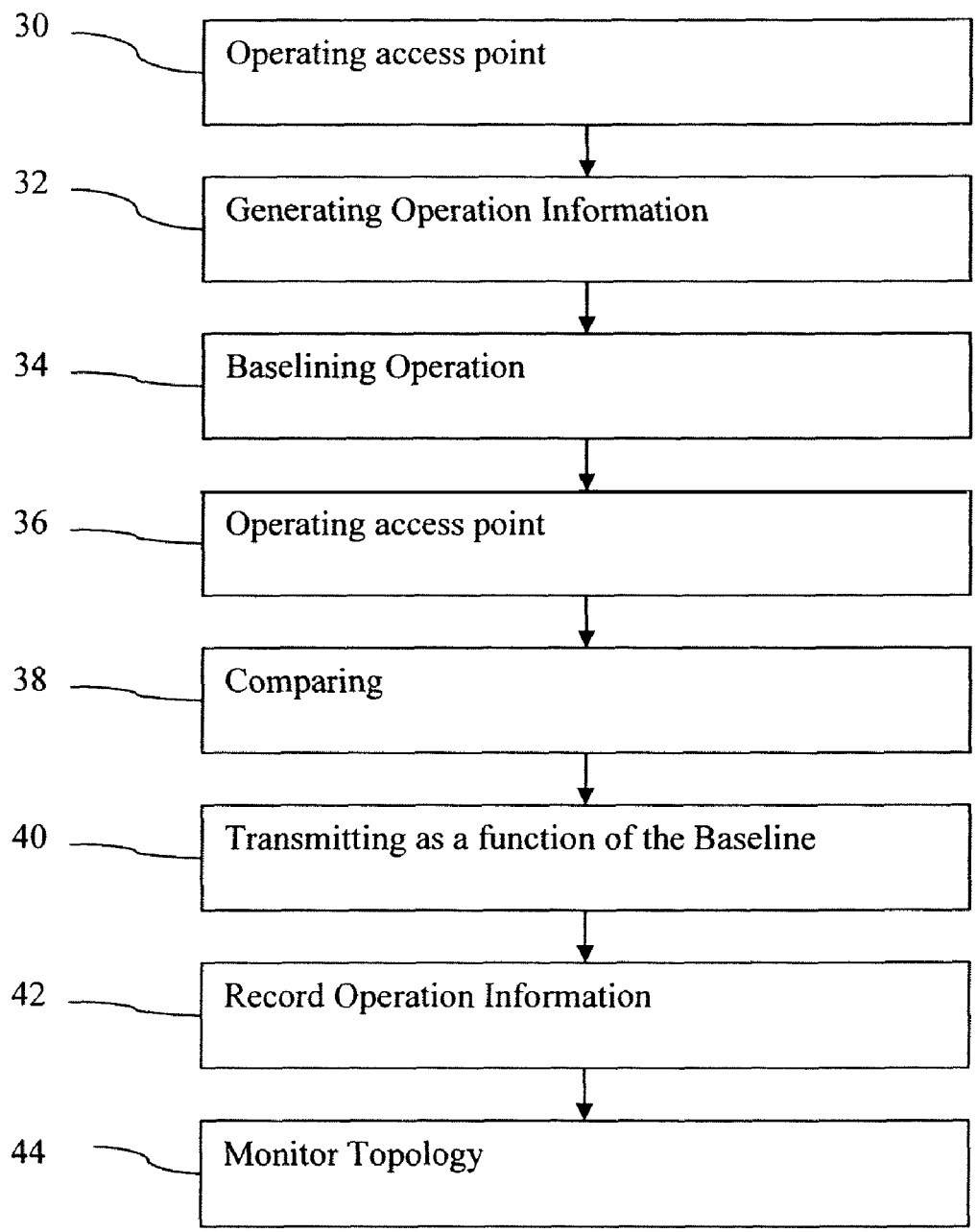
FIG. 2 illustrates one embodiment of a method for optimization of wireless access point management.

FIG. 2 is a flowchart of one embodiment of a method for optimization of wireless access point management. The method is implemented by the system 10 of FIG. 1 or a different system. In one embodiment, acts 30-40 are performed by an access point apparatus, but one or more of the acts may be performed, at least in part, by a controller and/or server. The acts are performed in the order shown or a different order. Fewer or more acts may be provided. For example, acts 40, 42, and/or 44 are not provided. As another example, the creation of the baseline in performed in act 34, but act 38 includes application of the baseline.

In act 30, operation information for a wireless access point is generated. The access point provides wireless traffic routing from a user device to a network or other computer. Different users may access the network through the access point.

By operating the access point, operation information may be generated in act 32. The operation of the access point is monitored or measured for management of the performance of the access point. Any type of operation may be measured. For example, access point wireless usage statistics, access point wireless user statistics, rogue data information, or combinations thereof are generated. Usage statistics include the amount of usage, the bandwidth of usage, peak usage, mean usage, median usage, duty cycle, response time, or other statistics or characteristics of usage. Identification data, such as the identity of users or groups using the network may be generated. The user statistics are usage information by user, user group, or other organization. For example, the user statistics or other information indicate the amount of usage by members of a corporation and the amount of usage by guests. Rogue data includes identification, usage, or other statistics related to unknown or unwanted users of the access point.

In one embodiment, the operation information includes spectrum information. For example, air quality information for at least one channel of the access point is generated. Any air quality information may include a wireless spectrum analysis, a duty cycle, interferer identification, interferer location, power of interference, clear channel assessment information, pulse period information, statistics derived there from, or combinations thereof. Other air quality information may be generated to reflect the wireless characteristics of channels. In one embodiment, various types of spectrum or interference information are combined into one or more metrics representing an over all air quality or air quality characteristic. The air quality information may include data identifying a source of interference and a power level of the interferer. This information may allow an administrator to locate and turn-off the interferer when needed, allow trouble shooting a customer call-in (e.g., a technician may remotely determine whether interference is a problem source), trend usage, and/or plan for configuration or topology changes.

Access point management data is generated from or is the operation information. The management data includes measures, statistics, metrics, or other information of the operation information. The management data is provided from the access point or used by the access point to control operation or configure operation of the access point and/or the corresponding network. In one example embodiment, air quality information is a metric of one or more characteristics formatted as approximately 50 bytes of information for each channel. For 11 channels of an access point, 550 bytes of air quality information are provided. For a dual band access point, further data is provided. Other sizes of data and formats may be used.

The operation information is generated over a period. The period includes one or more measurements or sets of data. In one embodiment, the operation information is generated every one or more seconds, one or more minutes, or at another interval. The operation information over a period of one or more hours, days, weeks, months, or other period is obtained.

The management data may be used for baselining in act 34. Baselining includes the generation of a reference operation, application of the reference operation, or combinations of both. Application as part of the baselining is discussed below with respect to act 38.

The baselining of act 34 provides a baseline of normal operation. A numerical representation of the operation information is determined. More than one baseline may be created, such as different baselines for different types of operation information. Different baselines or the same baseline are calculated for each channel and/or for each access point.

The baseline is determined as a function of time. The numerical representation provides one axis with time as another axis. The time axis extends over a given time or period, such as the hour, day, or week for which the operation information was obtained. For each time increment on the baseline, the performance level is provided. Where operation is determined over a plurality of cycles, an average, median, maximum, minimum or other combination may be used. The performance level is the operation information with or without weighting. For example, a threshold is added to the baseline such that the value plus the threshold defines normal operation. The threshold may be applied to either increase or decrease, such as providing for a range of normal operation below and above which is considered abnormal. Alternatively, the range is defined by a zero level up to a normal operation level.

The access point, controller, server, or other management component generates the baseline from the operation information. For example, the operation information is polled from or pushed to the access points to a controller and/or server. After intermediate routing, if any, the controller and/or server determine and store the baseline.

In one embodiment, the controller gathers the operation information. As the data is gathered or at longer periods, the controller provides the operation information or data derived there from to the server or other wireless network management system. Once operation data for a baseline period is acquired by the server, the server determines the baseline or reference performance. For each access point and/or channel, a graph of performance as a function of time is provided. In other embodiments, the controller or the access point determines the baseline.

The baseline is provided to other components of the network. For example, the access point and the controller have the baseline. Other components may additionally or alternatively store the baseline, such as the server.

Where the server or controller determines the baseline, the baseline is communicated to the access point. Alternatively, the comparison for baselining is performed by the controller to reduce bandwidth of communications and/or processing at the server or other downstream components of the network.

The entire baseline is provided to or at the access point. For example, the server downloads the baseline values as a set to the controller for each access point using the simple network management protocol or other configuration protocol. The controller pushes the baseline data to the appropriate access point using lightweight access point protocol or other protocol. Alternatively, only a portion of the baseline is provided. For example, the server provides a daily portion of the baseline to the controller due to memory or cache availability at the controller. Additionally or alternatively, the controller provides the portion to the access point. At or near (e.g., 5 minutes prior) the expiration of the relevant portion of the baseline, another or remaining portion of the baseline is provided. For example, the server monitors for expiration of a Monday portion and pushes a Tuesday portion of the baseline near the end of Monday.

In act 36, further operation information is generated by the access point, controller, and/or server. For example, the access point measures air quality, determines usage information, and/or determines other performance values. The same operation information generated in act 32 is generated in subsequent cycles of the reference or baseline period. The operation information is determined per channel, per access point, or for both.

In one embodiment, the access point stores the baseline information. Once configured, the access point continues to measure performance, such as air quality. The operation is measured at the same or different interval as in act 32.

This ongoing or current operation may be compared to the baseline in act 38. Prior to sending any updates of operation information to the controller, the access point compares the current operation information to the baseline. A value or numerical representation of the operation information at a given time in a cycle is compared to the baseline corresponding to the given time of the cycle. For example, data representing operation at 3 p.m. is compared to the baseline for operation at 3 p.m. The comparison identifies any operation outside of the range of operation.

In act 40, management data is transmitted as a function of the comparison with the baseline. The transmission is over a wired network using any communication protocol (e.g., simple network management protocol). Alternatively, the transmission is over a wireless backbone using a mesh network or other protocol.

None or a truncated version of the operation information is transmitted where the current operation information is within the normal range of operation, such as a threshold of the baseline. The current operation information that is outside the range of operation is transmitted as management data. A subset of the current operation information for a given period may be transmitted. The subset is of the data deviating from the baseline and any indications showing operation within the baseline.

The lack of data, data indicating baseline performance, or data having fewer bits due to representing a difference from the baseline rather than the measured values are transmitted where the operation is normal or within the range of operation of the baseline.

In one embodiment, the access point sends a flag, such as a byte per channel, that indicates the metric or type of operation as being the same as the baseline or within the range of normal operation (e.g., within a configured tolerance). In the 50-byte example above, all the channels being within the baseline results in 11 bytes per access point instead of 550 bytes. Other formats and data sizes may be used.

In another embodiment, the access point does not send the operation information that is within the range of normal operation. For example, if all channels are comparable with the baseline at a given time or over a predetermined period, a lack of data transmission indicates baseline operation. Alternatively, an octet or other data package is transmitted to indicate that the baseline was met for the period instead of a communications fault. As another example, operation information is sent for one or more channels with operation outside of the baseline. The lack of information for the other channels indicates operation within the range of normal.

In act 42, operation of the access point is recorded. The access point, the controller, the server, other network component or combinations thereof record the operation. For example, the controller may parse the transmitted message to obtain the access point and/or channel specific operation information. No information, information showing baseline or normal operation, values for non-normal operation, and/or other indication are received. Rather than receiving the measurement each time baseline operation occurs, the controller merely obtains the actual measurement from the stored baseline information and stores the baseline value to represent the current sample time. Alternatively, a time stamp associated with the baseline is updated to include the current period or time of operation, avoiding loading and recording the baseline measurement multiple times. The timestamp is refreshed for the baseline value corresponding to the current time in the reference cycle.

If the current operation is within the range of normal operation, the baseline information obtained in act 30 or a time stamp is recorded for the access point, channel, and/or type of baseline. If the current range of operation is outside of the range of normal operation, the current operation information provided in act 36 is recorded. In addition to reducing the traffic load from the access point to the controller, the baselining may reduce the traffic load of management data from the controller to the wireless network management system, such as the server.

The recording does not account for previous values of the current operation. The baseline is maintained without updating merely because an out of range value was received. Other triggers or time may be used to update the baseline. For example, in act 44, the network is monitored for a change in topology. The wireless network management system, such as a location server, identifies automatically or in response to user input a change in topology. Any change may be detected, such as adding a new access point, or an access point going out of server temporarily or permanently. The baseline is updated in response to a change in topology. New measurements are performed for operation over the baseline period, and new baselines are created. The baselines of all or some access points, channels, and/or types of operation are updated, such as changing the baselines only for adjacent access points (e.g., access points in a same floor or building) to a new or removed access point and/or such as changing baseline values which are different than previous values. Old baselines may continue to be used for access points less likely or not altered by the change in topology. The baselines are dynamically monitored for validity and updated when needed.

Once the new baseline is created or updated, the baseline is provided (e.g., pushed) to the access points. During acquisition of the new baselines, the access points operate without baselining, such as providing the measured data without comparison or reduction of traffic load. Alternatively, the old baselines are used despite the change in topology until new or updated baselines are provided.

Different components provide different functions for implementing baselining. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method comprising:
   monitoring at least one operation metric for a wireless access point;
   generating, at the wireless access point, a first operation value information of the at least one operation metric for the wireless access point over a time period;
   baselining the at least one operation metric, the baselining providing a baseline range of operation;
   generating a second operation value of the at least one operation metric for the wireless access point;
   comparing the second operation value to the baseline range of operation;
   recording operation of the wireless access point with the first operation value by encoding a first number of bits when the second operation value is within the baseline range of operation; and
   recording operation of the wireless access point with the second operation value by encoding a second number of bits when the second operation value is outside of the baseline range of operation, wherein the first number of bits is less than the second number of bits.

2. The method of claim 1 wherein generating the first operation value and the second operation value comprises generating access point wireless usage statistics, access point wireless user statistics, rogue data information, or combinations thereof.

3. The method of claim 1 wherein generating the first operation value and the second operation value comprises generating access point management data.

4. The method of claim 1 wherein generating the first operation value and the second operation value comprises generating a wireless spectrum analysis for at least one channel of the wireless access point.

5. The method of claim 1 wherein generating the first operation value and the second operation value comprises generating a wireless spectrum analysis, a duty cycle, interferer identification, interferer location, power of interference, clear channel assessment information, pulse period information, statistics derived there from, or combinations thereof.

6. The method of claim 1 wherein baselining comprises determining a first numerical representation of the first operation value as a function of time over the time period per channel of the wireless access point, the first numerical representation being the baseline range of operation, and wherein comparing comprises comparing a second numerical representation of the second operation value at a given time in a cycle to the baseline range of operation corresponding to the given time of the cycle.

7. The method of claim 1 further comprising:
   transmitting none of the second operation value when the second operation value is within a threshold of the baseline range of operation.

8. The method of claim 1 wherein the baseline range of operation is determined by a controller or server connected with a plurality of access points including the wireless access point; and
   further comprising:
   providing at least a portion of the baseline range of operation to the wireless access point from the controller or server.

9. The method of claim 8 wherein the baseline range of operation is determined by the server, the server providing the at least a portion of the baseline range of operation to the controller due to memory availability at the controller, and the controller providing the at least a portion of the baseline range of operation to the wireless access point;
   further comprising:
   the server providing a remaining portion near expiration of the at least a portion of the baseline range of information.

10. The method of claim 1 further comprising:
    monitoring a network including the wireless access point for a change in topology; and
    updating the baseline range of operation in response to the change in topology.

11. The method of claim 1 further comprising:
    communicating a sub-set of the second operation value over a wireless mesh network to a controller of the wireless access point, the sub-set being the second operation value deviating from the baseline range of operation.

12. The method of claim 1 further comprising:
    transmitting the second operation value that is outside the baseline range of operation.

13. An apparatus comprising:
    an access point for routing wireless data; and
    a processor operable to output an indication of an operation of the access point, the indication being a function of a baseline, the baseline having different values as a function of time, the operation being at a time period associated with one of the values of the baseline,
    wherein the operation comprises interference for at least one channel of the access point, the indication being a measurement of the interference when the measurement exceeds the baseline, the measurement encoded by a first number of bits, and being a baseline reference when the measurement is within the baseline, the baseline reference encoded by a second number of bits, wherein the second number is less than the first number.

14. The apparatus of claim 13 wherein the baseline is maintained to indicate normal despite variation of the operation outside of the baseline.

15. A system comprising:
    a plurality of access points;
    a controller operable to communicate with the plurality of access points; and
    a server operable to communicate with the controller;

wherein the controller, server, or combination thereof is operable to determine a reference performance level of each of the plurality of access points and communicate the reference performance levels to the respective access points;

wherein each of the plurality of access points are operable to compare a current performance level to the respective reference performance level and communicate a first amount of performance data to the controller, server, or combinations thereof when the current performance level is within a threshold range of the reference performance level for the access point and a second amount of performance data when the current performance level is not within the threshold range, the reference performance level maintained for at least a first period regardless of the current performance levels within the first period being outside the threshold range, wherein the first amount of performance data comprises only one bit and the second amount of performance data comprises more than one bit.

16. The system of claim 15 wherein the reference performance level includes a plurality of values as a function of time, the current performance level associated with a time, the value of the performance level corresponding to the time in a previous cycle being compared with the current performance level.

17. The system of claim 15 wherein the reference performance level and current performance level correspond to wireless communication interference of the respective access point.

18. The system of claim 15 wherein the controller, the server, or combination thereof is operable to update a time stamp associated with the reference performance level in response to receiving a result or no data, and operable to store the current performance data for the performance data not within the threshold range.

19. Software encoded in one or more non-transitory computer-readable media and when executed operable to:

generate first operation information for a wireless access point over a time period;

baseline the first operation information, the baselining providing a baseline range of operation;

generate second operation information for the wireless access point;

compare the second operation information to the baseline;

record operation of the wireless access point with the first operation information using a first number of bits if the second operation information is within the baseline range of operation; and record operation of the access point with the second operation information using a second number of bits if the second operation information is outside of the baseline range of operation, wherein the first number of bits is less than the second number of bits.

* * * * *